Oct. 25, 1932.   S. B. ATWOOD   1,884,506
DOOR BUMPER
Filed July 15, 1931
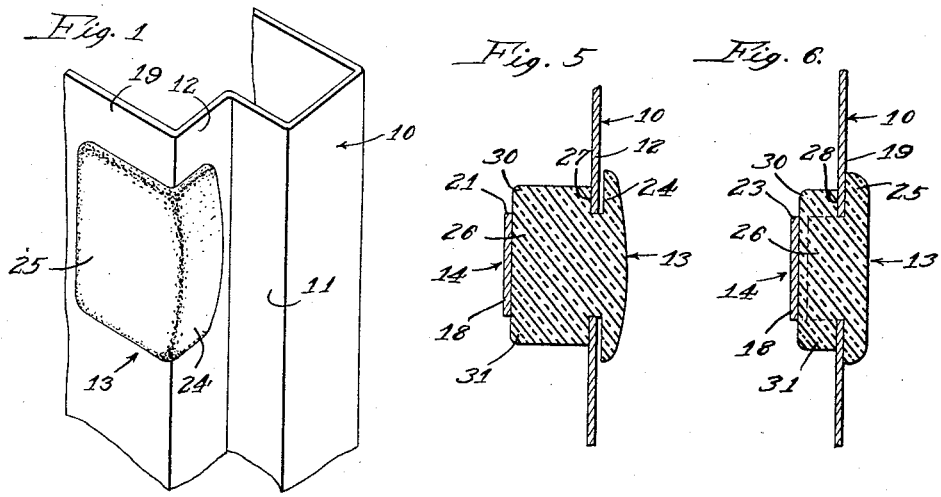
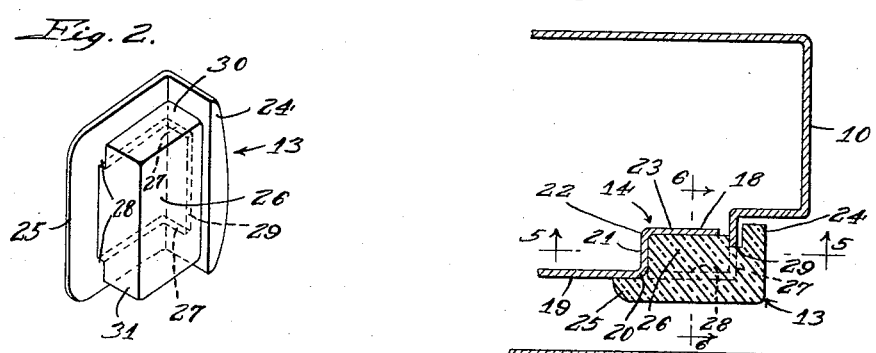
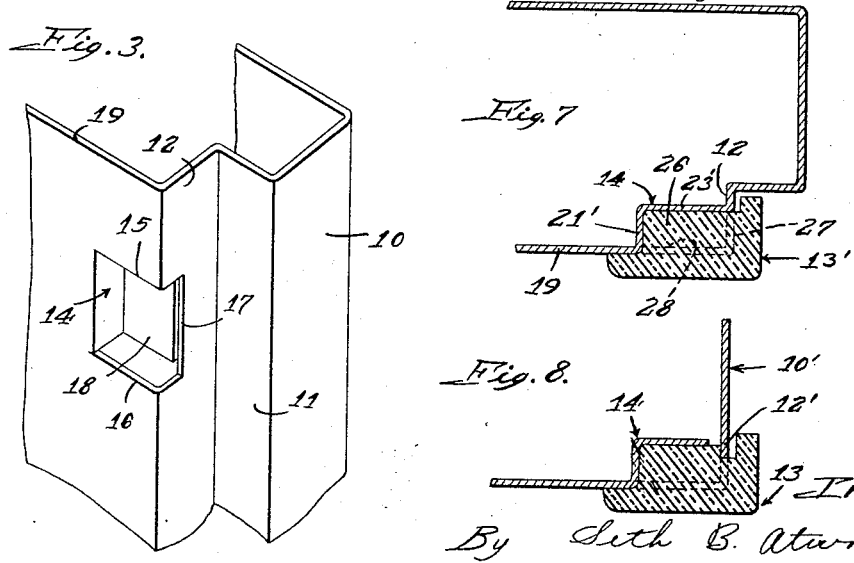
Inventor
By Seth B. Atwood
Wilson, Dowell, McCanna & Rehm
Attys.

Patented Oct. 25, 1932

1,884,506

UNITED STATES PATENT OFFICE

SETH B. ATWOOD, OF ROCKFORD, ILLINOIS

DOOR BUMPER

Application filed July 15, 1931. Serial No. 550,858.

This invention relates to bumpers for automobile doors, for cushioning the closing of the doors, as well as preventing rattling thereof in closed position.

When automobile body frames were of wooden construction, bumpers could be fastened in place thereon satisfactorily by means of a stamped sheet metal retainer fastened in a socket cut therefor in the frame, as illustrated in Atwood Patents #1,523,627 and #1,535,446. The change to steel frame construction, or steel covered frame construction brought with it the problem as to how to fasten the bumpers satisfactorily under these conditions. It is, therefore, the principal object of my invention to provide a bumper of resilient material, generally similar to those used heretofore, but having the retainer therefor formed directly in the steel frame.

In the mounting of a bumper in a hole provided therefor in the steel frame, it is a problem to support the bumper properly for compression thereof. It is accordingly another object of my invention to form the retainer in the frame in such a way that a wall is provided to back up the bumper for proper support thereof.

The invention is illustrated in the accompanying drawing, in which—

Figure 1 is a perspective view showing a door jamb equipped with a bumper made in accordance with my invention;

Fig. 2 is a perspective view of the bumper removed looking at it from the back;

Fig. 3 is a view corresponding to Figure 1, but showing the bumper removed so as to disclose the retainer;

Fig. 4 is a section in a horizontal plane through Figure 1;

Figs. 5 and 6 are vertical sections on the correspondingly numbered lines of Fig. 4;

Fig. 7 is a section similar to Fig. 4, but showing a slightly modified construction, and Fig. 8 is a section similar to Fig. 4 showing the application of the bumper to an unrabbeted or plain frame.

Similar reference numerals are applied to corresponding parts throughout the views.

I have illustrated the invention as applied to an automobile frame of steel construction, but it will soon appear that the invention is equally adapted to frames of combined steel and wood construction. The pillar portion of the steel frame shown at 10 is rabbeted, as indicated at 11, to provide the door jamb or impact ledge 12 offset inwardly from the plane of the outside of the body for the reception of the complementarily formed edge of the door arranged to strike the bumper, indicated generally by the reference numeral 13. The retainer for the bumper is, in accordance with my invention, formed directly in the frame, as indicated at 14, thus making the same adaptable with equal facility to automobile frames of steel construction, or combined steel and wood construction, as should be self-evident. In a frame of combined steel and wood construction, the steel covers the wood and the latter is, of course, simply routed out at the proper places to make room for the retainers and allow enough room above and below the same for the end portions of the bumper, as will soon appear.

The frame 10 has the retainer 14 formed therein by cutting the same horizontally at 15 and 16 rearwardly from the door jamb 12 and vertically, as at 17, in the jamb, thus providing a tongue 18 of sheet metal integral with the frame, from which to form the retainer. The tongue 18 is bent inwardly substantially at right angles to the side wall or flange 19, as indicated at 20, to form the bumper seat 21 of the retainer. The tongue is bent again at right angles, as at 22, into parallelism with the side wall 19 to form the back wall 23 of the retainer. Now, the bumper 13 is of molded rubber or other suitable resilient material in the form of a generally L-shaped body providing a narrow front flange 24 for abutment by the door and a wider side flange 25 to fit against the side wall 19 of the frame. An elongated boss 26, rectangular in cross-section, is provided on the back of the bumper between the flanges 24 and 25. Grooves 27 are formed at the upper and lower ends of the boss 26 directly behind the front flange 24, and similar grooves 28 directly behind the side flange 25. There is, in addition, another groove 29 extending from the upper to the lower end of the boss 26 directly behind the front flange. The boss 26 is arranged to fit snugly in the angle defined between the walls 21 and 23, as clearly appears in Fig. 4, but is of such length that its upper and lower ends extend beyond the retainer, as indicated at 30 and 31 in Figs. 5 and 6, the projecting end portion 30 being defined between the grooves 27 and 28 at the upper end of the boss, and the projecting end portion 31 being defined between the grooves 27 and 28 at the lower end. Thus, in installing the bumper, either of the end portions 30 and 31 is first entered into the retainer, and the bumper is then compressed endwise until it is possible to force the other end portion into the retainer, whereupon the bumper immediately expands and is thereby securely anchored in place. The grooves 27 at the upper and lower ends of the boss receive the wall 12 forming the door jamb, and the grooves 28 at the upper and lower ends of the boss receive the side wall 19, said walls having edges defined for that purpose where the same are cut along the lines 15 and 16. The groove 29 receives the wall 12 defining the door jamb, said wall having an edge defined for that purpose where it is cut along the line 17.

It should be apparent from the foregoing description that I have provided a bumper of simple and economical construction, and one which is thoroughly practical and will give good service, owing to the fact that it is properly backed up in its retainer for compression, and is securely anchored in place so that it cannot possibly drop out.

In Fig. 8, a retainer 14 for a bumper 13 is shown provided in a frame 10' of plain or unrabbeted construction in which the front wall 12' forming the outside of the frame serves directly as the door jamb. It is obvious that the application of my improved bumper is the same in this case as in the other.

In Fig. 7 I have illustrated a slightly modified form of retainer 14' for a bumper 13' of slightly modified construction. In this case the jamb 12 is not cut along the line 17 but only along the lines 15 and 16, and is then stamped to provide the retainer 14' having the end wall 21' and side wall 23' continuous with the side wall 19 and jamb 12.

In this case, as in the other, the grooves 27 and 28 in the upper and lower ends of the boss 26 are provided for reception of the walls 12 and 19, respectively, but the groove 29 is omitted, there being no wall for entry in such a groove. In other words, in this form, the upper and lower end portions 30 and 31, respectively, constitute the sole means for anchorage of the bumper. In this case, as in the other, the retainer 14' provides good backing for the bumper for the purpose of compression thereof.

I claim:

1. In a device of the class described, a sheet metal door pillar suitably formed to provide an impact ledge and a flange extending inwardly therefrom, said pillar being provided with an opening in the ledge and extending a certain distance in said ledge laterally from said flange and a certain distance inwardly in said flange, the sheet metal of said pillar being bent laterally from said flange into the pillar at the inner end of said opening to provide a bumper seat, integral with said flange, spaced inwardly from said impact ledge and wider than that portion of the opening in the ledge.

2. In a device of the class described, a sheet metal door pillar suitably formed to provide an impact ledge and a flange extending inwardly therefrom, said pillar being provided with an opening in the ledge and extending a certain distance in said ledge laterally from said flange and a certain distance inwardly in said flange, the sheet metal of said pillar being bent laterally from said flange into the pillar at the inner end of said opening to provide a bumper seat, integral with said flange, spaced inwardly from said impact ledge, said sheet metal being further bent outwardly from the bumper seat toward the impact ledge to provide a back wall terminating in a predetermined relation to the impact ledge portion, whereby to define a shoulder between the back wall and the inside of the impact ledge portion next to the bumper opening in the ledge.

3. In a device of the class described, a sheet metal door pillar suitably formed to provide an impact ledge and a flange extending inwardly therefrom, said pillar being provided with an opening in the ledge and extending a certain distance in said ledge laterally from said flage and a certain distance inwardly in said flange, the sheet metal of said pillar being bent laterally from said flange into the pillar at the inner end of said opening to provide a bumper seat, integral with said flange, spaced inwardly from said impact ledge in a predetermined relation to a bumper retaining shoulder formed on the inside of the impact ledge portion next to the bumper opening in said ledge.

4. In a device of the class described, a sheet metal door pillar suitably formed to provide an impact ledge portion and a flange portion extending inwardly therefrom, said pillar being provided with an opening in the ledge portion and extending a certain distance in said ledge portion laterally from said flange portion and a certain distance inwardly in said flange portion, the sheet metal of said pillar being bent inwardly into the pillar from one of said portions substantially at right angles thereto to provide one wall of a bumper pocket integral with the portion of said pillar and being bent further substantially at right angles toward the other portion of said pillar but terminating short of said portion to provide another wall for the bumper pocket.

In witness of the foregoing I affix my signature.

SETH B. ATWOOD.